United States Patent [19]

Hanebrink, Jr.

[11] Patent Number: 5,490,054
[45] Date of Patent: Feb. 6, 1996

[54] RINGING GENERATOR AND METHOD FOR CONVERTING DC TO AC HAVING CONTINUOUSLY ADJUSTABLE AMPLITUDE

[75] Inventor: Lawrence E. Hanebrink, Jr., St. Louis County, Mo.

[73] Assignee: Ferro Magnetics Corporation, Bridgeton, Mo.

[21] Appl. No.: 318,374

[22] Filed: Oct. 5, 1994

[51] Int. Cl.$^6$ .......................... H02M 3/335; H02M 3/00
[52] U.S. Cl. ............................... 363/21; 379/418
[58] Field of Search .................. 363/19, 21, 50, 363/55, 56, 74, 95, 97, 131; 361/18–21, 59, 88; 379/322, 323, 418

[56] References Cited

U.S. PATENT DOCUMENTS

| | | | |
|---|---|---|---|
| 3,248,634 | 4/1966 | Fudaley et al. | 379/418 |
| 3,778,730 | 12/1973 | Cromwell et al. | 331/109 |
| 3,878,340 | 4/1975 | Shaffer | 179/18 HB |
| 3,886,321 | 5/1975 | Krasin et al. | 179/84 R |
| 3,904,833 | 9/1975 | Beene et al. | 179/84 R |
| 4,056,692 | 11/1977 | Place | 179/84 R |
| 4,056,693 | 11/1977 | Bosik et al. | 179/84 R |
| 4,192,007 | 3/1980 | Becker | 364/721 |
| 4,220,826 | 9/1980 | Kiss | 179/51 AA |
| 4,239,935 | 12/1980 | Bosik et al. | 179/84 R |
| 4,355,206 | 10/1982 | Israel et al. | 179/18 HB |
| 4,496,800 | 1/1985 | Young | 479/175.2 R |
| 4,575,585 | 3/1986 | Brown | 179/84 A |
| 4,611,097 | 3/1986 | Grimes | 179/84 A |
| 4,636,927 | 1/1987 | Rhyne et al. | 363/15 |
| 4,648,019 | 3/1987 | Stahl | 363/43 |
| 4,866,587 | 9/1989 | Wadlington | 363/16 |
| 4,965,692 | 10/1990 | Burns et al. | 361/18 |
| 5,237,606 | 8/1993 | Ziermann | 363/21 |
| 5,260,996 | 11/1993 | Dillon et al. | 379/418 |
| 5,402,480 | 3/1995 | Hirahara | 379/418 |

*Primary Examiner*—Matthew V. Nguyen
*Attorney, Agent, or Firm*—Polster, Lieder, Woodruff & Lucchesi

[57] ABSTRACT

A ringing generator and a method for converting a DC input voltage signal from a DC source to an AC output voltage and supplying this output voltage to a variable load. The output signal has a continuously adjustable amplitude so as to continuously adapt to the current demanded by the load. A power supply converts the DC input voltage to variable DC supply voltages. A linear amplifier then converts these variable supply voltages to an AC output voltage using a precision sine wave oscillator as a reference. A load current sensor senses and measures the output current being supplied to the load and then a control circuit is employed to automatically and continuously adjust the amplitude of the output voltage to maintain the maximum output current that can be safely supplied to the load by the linear amplifier. An output voltage sensor senses and measures the output voltage being supplied to the load and then a control circuit is employed to automatically and continuously adjusts the amplitude of the variable DC supply voltages based upon the output voltage so as to guarantee that at any instant in time the variable DC supply voltages are slightly greater in magnitude than the output voltage at the same instant in time. The ringing generator also includes a fault monitor for continually monitoring multiple critical locations in the ringing generator for any anomaly that would affect the output voltage of the unit and thereby degrade the performance of the ringing generator. Ringing generators may be connected in parallel for increased capacity without any additional external equipment.

30 Claims, 7 Drawing Sheets

RINGING GENERATOR AND METHOD FOR CONVERTING DC TO AC HAVING CONTINUOUSLY ADJUSTABLE AMPLITUDE

BACKGROUND OF THE INVENTION

This invention relates to a DC to AC converter and more particularly to a ringing generator converting a DC input voltage to an AC output voltage with continuously adjustable frequency and amplitude on which a ringback tone may be superimposed.

In a typical DC to AC converter, a DC voltage from a DC source is supplied to a DC to DC converter which converts this input voltage to fixed or variable DC supply voltages. A signal generator or reference oscillator generates a reference signal which represents the desired output waveform. The fixed or variable DC voltages are supplied to a linear amplifier which is controlled by the reference oscillator. The linear amplifier generates an AC output voltage having a peak amplitude which is less than that of the fixed or variable DC voltages generated by the DC to DC converter.

The DC to AC converter described in Rhyne et al, U.S. Pat. No. 4,636,927 discloses an improvement in efficiency and a simplification of earlier DC to AC converters. U.S. Pat. No. 4,636,927 uses adjustable power supplies, i.e. "wraparound supplies," for the linear amplifier.

The wraparound supply of U.S. Pat. No. 4,636,927 is controlled by a low frequency reference oscillator which is also the reference signal from which the AC output is derived. The reference oscillator control of the wraparound supply causes it to follow the wave shape of the AC output from the linear amplifier, but at a slightly higher voltage magnitude. In this manner, the power dissipation in the linear amplifier is reduced, since the average voltage across the output power transistors is reduced from that with a fixed voltage DC power supply, which would have to be set for a voltage slightly above the peak AC output voltage of the linear amplifier.

The DC to AC converter of the Rhyne patent uses control means derived from the reference oscillator to control the supply voltages of the linear amplifier. The Rhyne control means achieve improved efficiency by reducing the average voltage across the power transistors in the linear amplifier from that obtained in earlier DC to AC converters that employ a constant DC supply. However, the Rhyne control means do not address operation of the linear amplifier under overload conditions.

Other prior devices include ringing generators. Some earlier ringing generators "clipped" the output voltage at the level where the maximum safe current was being supplied to the load, thereby causing distortion in the output voltage wave form.

Ringing generators have been connected in a parallel combination to increase output capacity. If redundancy is needed to increase the reliability of the parallel combination, the units are typically configured in a "2N" redundancy arrangement, where N is the number of units needed to drive the applied load. Two ringing generators, or two banks of ringing generators are connected to external monitoring and switch-over means.

The monitoring and switch-over means cause one bank of ringing generators to be connected to the load. Should this bank fail, the external monitoring and switch-over means disconnect it and connect the second bank of ringing generators to the load instead.

SUMMARY OF THE INVENTION

A primary object of this invention is to provide a control circuitry for a ringing generator which ensures the reliability of and protects the linear amplifier during overload conditions.

Another object of this invention is to provide a control circuitry which continuously monitors and adjusts the variable DC supply voltages so that at any instant in time the magnitude of the variable DC voltage is slightly greater than that of the output voltage at that same instant in time, regardless of the loading applied.

Still another object of this invention is to provide an undistorted output voltage under all loading conditions.

A further object of this invention is to provide monitoring and control circuitry that permit ringing generators to operate in parallel in an "N+1" redundancy arrangement, or other parallel arrangement, with no additional external monitoring and switch-over means needed to remove one or more failed units from the parallel arrangement.

These and other objects and advantages will become apparent hereinafter.

To achieve these objectives, the ringing generator of this invention and a method therefor includes circuitry for converting a DC input voltage to an AC output voltage with a continuously adjustable frequency and amplitude so as to continuously adapt to the current demanded by a variable load to which the ringing generator is connected. More specifically, a DC source supplies a DC input voltage to a power supply which in turn generates variable DC supply voltages. These variable supply voltages are converted to the AC output voltage by a linear power amplifier. A load current sensor monitors the output current of the ringing generator. Based on the current being supplied to the load, a control circuit automatically and continuously adjusts the amplification of the variable supply voltages so as to guarantee that at any instant in time the supply voltages are slightly greater in magnitude than the output voltages at that instant in time. A plurality of ringing generators can be connected in a parallel combination to increase the power output being supplied to the load.

The ringing generator also includes a fault monitoring circuit for continually monitoring a plurality of critical locations in the unit for any anomaly that would affect the output voltage and thereby degrade the performance of the ringing generator. The fault monitoring circuit automatically removes a failed ringing generator from service, generates an alarm signal, and activates a fault indicator if an anomaly is detected. When the anomaly clears, the fault monitoring circuit is automatically reset and the ringing generator becomes fully operational.

DESCRIPTION OF THE DRAWINGS

In the drawings, wherein like numbers refer to like parts wherever they occur,

FIG. 7A depicts a ringing generator operated individually. FIG. 7B depicts the parallel operation of a plurality of ringing generators.

DETAILED DESCRIPTION OF THE PREFERRED EMBODIMENT CIRCUIT DESCRIPTION

Figure 1:
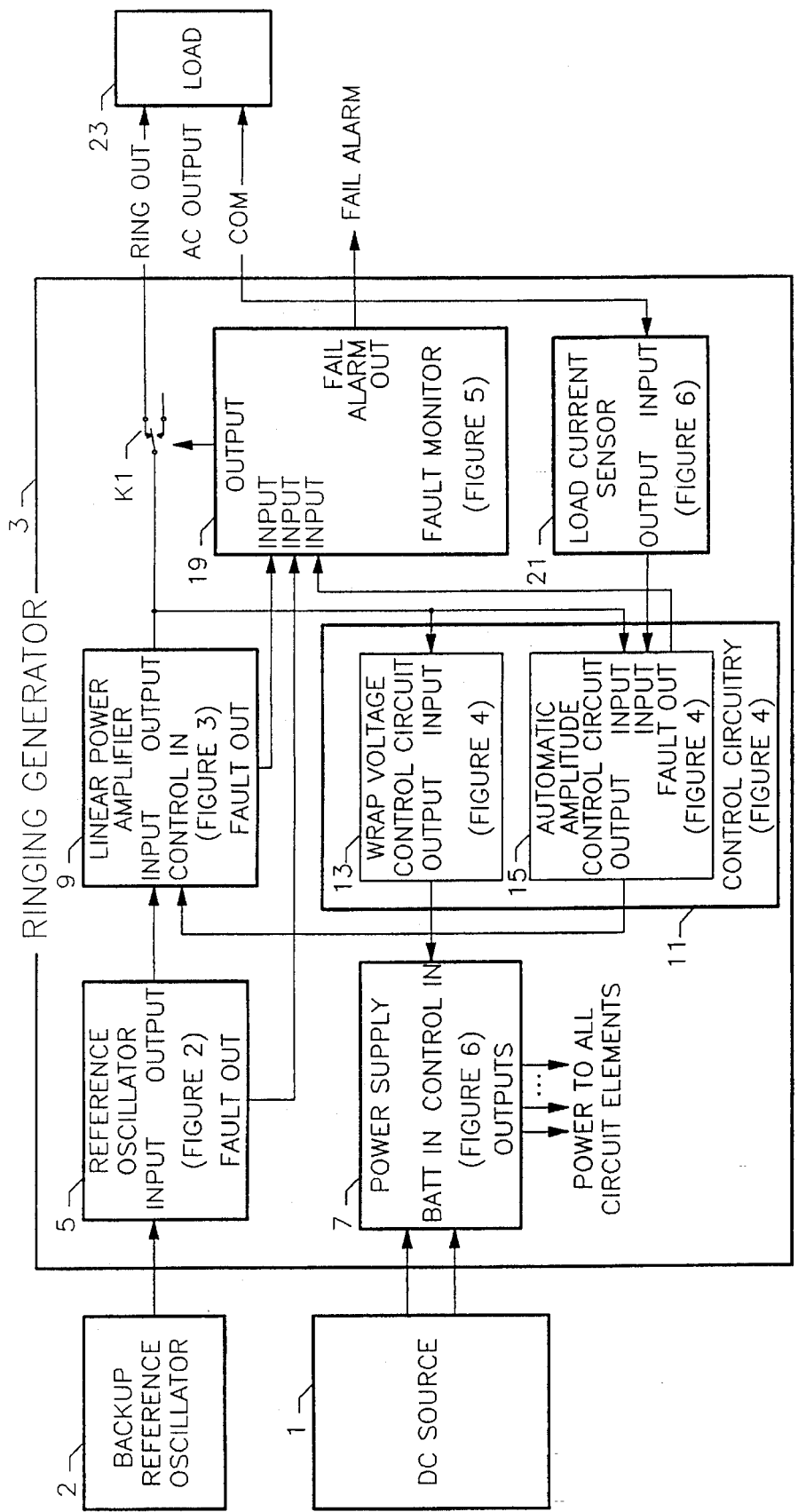
FIG. 1 is a block diagram of the present invention.

The ringing generator of this invention comprises the following circuit functions:

1. A reference oscillator 5,
2. A linear power amplifier 9,
3. A control circuitry 11, including
   a. A wrap voltage control circuitry 13 and
   b. An automatic amplitude control circuitry 15,
4. A fault monitor 19,
5. A load current sensor 21, and
6. A power supply 7

The schematic diagrams of these circuit functions are shown in FIGS. 2–6 which all can be overlaid into a single circuit. The operation of each of these circuit functions is described below. Furthermore, it will be shown that a ringing generator 3 can be operated individually or in a parallel combination with other ringing generators.

REFERENCE OSCILLATOR 5

Figure 2:
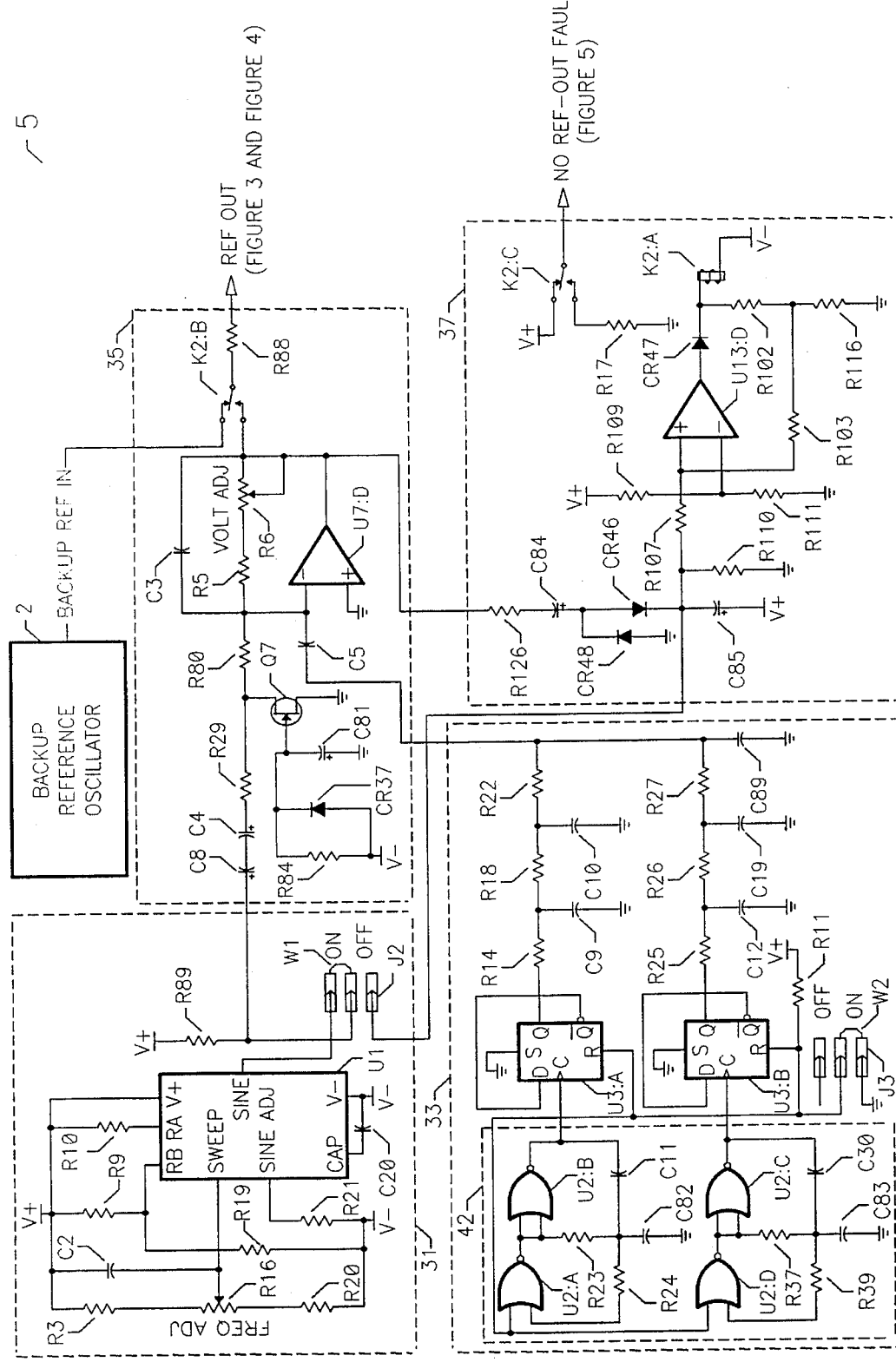
FIG. 2 is a schematic of the reference oscillator elements of the present invention.

As shown in FIGS. 1 and 2, the reference oscillator 5 is used to generate a waveform that is supplied to linear power amplifier 9. The reference oscillator 5 comprises a sine wave oscillator 31, a dual tone ringback oscillator 33, a summing amplifier 35 (which combines the outputs of the two oscillators), and fault monitoring control circuitry 37. The dual tone ringback oscillator may be turned ON or OFF by means of a jumper W2. The sine wave oscillator may be turned ON or OFF by means of a jumper W1.

a) Sine Wave Oscillator 31

The sine wave oscillator 31 comprises a signal generating chip U1 and the associated discrete components. Generator U1 is a precision wave form generator which provides high accuracy sinusoidal, triangular, and square wave forms. Only the SINE output is used. The nominal oscillator frequency is set by a capacitor C20 and a pair of resistors R9 and R10. The frequency is varied by applying a variable voltage to the "SWEEP" input of the chip U1. The variable voltage is obtained from the V+ and V− DC supplies using a trimpot R16 and a pair of resistors R3 and R20. A frequency range of approximately 14 Hz to about 75 Hz is provided.

Resistor R10 controls the rising portion of the sine wave form. Resistor R9 and a resistor R19 control the falling portion of the sine wave form. Resistor R19 is needed to compensate for a small difference in the input stages at the RA and RB pins of chip U1. By closely balancing these inputs, a 50% duty cycle and minimal harmonic distortion is achieved.

The peak-to-peak output amplitude at the SINE output of generator U1 is nominally ⅓ of the power supply across the V+ and V− pins. The output is fed through a header J2 which allows the output to be strapped either "OFF" or "ON" with jumper W1.

b) Ringback Oscillator 33

The ringback oscillator 33 includes a pair of astable multivibrators 42 consisting of four NOR gates labeled as U2:A, U2:B, U2:C, U2:D and the associated resistors and capacitors. Gates U2:A and U2:B form one multivibrator with a capacitor C11 and a resistor R23 chosen to set the frequency at 960 Hz. Gates U2:C and U2:D form the other multivibrator, with a capacitor C30 and a resistor R37 chosen to set the frequency at 880 Hz. A pair of resistors R24 and R39 provide the feedback necessary to make each multivibrator ran. A header J3 is used to gate the oscillator ON or OFF by means of a jumper W2. The output of gate U2:B is a square wave with a frequency of 960 Hz. The output of gate U2:C is a square wave with a frequency of 880 Hz. A pair of capacitors C82 and C83 insure a clean edge with no reversals on the output wave form.

The square wave signals generated by gates U2 do not necessarily have a 50% duty cycle. A pair of flip-flops U3:A and U3:B divide the frequency in half and convert the square waves to a 50% duty cycle. The Q output of flip-flop U3:A is a square wave with a frequency of 480 Hz. The Q output of flip-flop U3:B is a square wave with a frequency of 440 Hz.

The 480 Hz square wave is heavily filtered by a resistor R14 and a capacitor C9 to obtain a wave form approximating a triangle wave. The triangle wave is further filtered by a resistor R18 and a capacitor C10 to approximate a sine wave. Due to the large amount of filtering, the amplitude of the signal at capacitor C10 is reduced to the millivolt range, with a DC bias of half the V+ supply voltage. Resistor R22 feeds the signal into a summing amplifier U7:D using a capacitor C5 to remove the DC bias.

The 440 Hz square wave is heavily filtered by a resistor R25 and a capacitor C12 to obtain a wave form approximating a triangle wave. The triangle wave is further filtered by a resistor R26 and a capacitor C19 to approximate a sine wave. Due to the large amount of filtering, the amplitude of the signal at capacitor C19 is reduced to the millivolt range, with a DC bias of half the V+ supply voltage. A resistor R27 feeds the signal into summing amplifier U7:D using an AC coupling capacitor C5 to remove the DC bias. A capacitor C89 provides high frequency filtering.

c) Summing Amplifier 35

The signals from the sine wave oscillator 31 and the ringback oscillator 33 are summed together using an operational amplifier U7:D and the associated components of a summing amplifier 35. The gain of the amplifier 35 is determined by the ratio of the feedback resistance (R5+R6) to the input resistance for each signal being summed: resistors R29+R80 for the sine wave, resistor R22 for the 480 Hz tone, and resistor R27 for the 440 Hz tone. A pair of capacitors C8 and C4 provide AC coupling for the sine wave signal, and a capacitor C5 provides AC coupling for the dual-frequency ringback tone. A capacitor C3 provides high frequency filtering. A potentiometer R6 is used to adjust the amplitude of the REF OUT signal.

A soft start control holds the REF OUT amplitude at near zero volts for a short time after power up. When power is initially applied, the voltage across a capacitor C81 is zero. This holds a junction FET Q13 in an ON state. A resistor R84 charges capacitor C81 toward V−. As the gate voltage decreases toward V−, the ON resistance of JFET Q13 increases, providing a variable attenuator consisting of a resistor R29 and JFET Q13. When the gate voltage is negative enough that JFET Q13 is fully OFF, the REF OUT signal is at full amplitude.

d) Fault Monitoring Circuitry 37

A relay K2:B normally selects the output of a summing amplifier 35 and passes it to the REF OUT output. If the internal sine wave oscillator 31 has failed and is not running, then the NO REF-OUT DETECT circuit 37 causes the relay to select an external backup reference oscillator 2 which generates a BACKUP REF IN signal and pass it to the REF OUT output. A further discussion of the NO REF-OUT DETECT circuit 37 is in the Fault Monitor section.

LINEAR POWER AMPLIFIER 9

Figure 3:
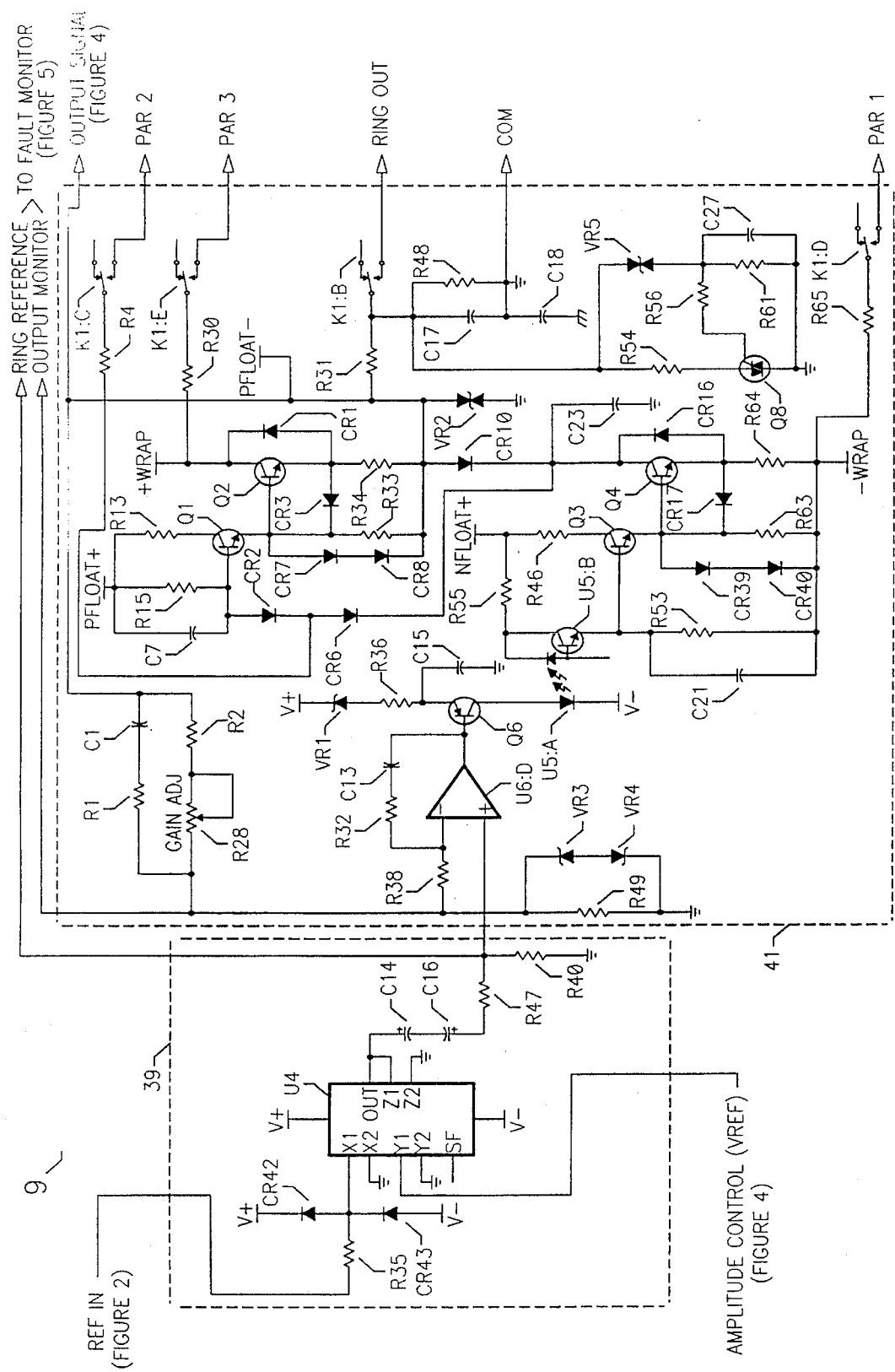
FIG. 3 is a schematic of the linear power amplifier elements of the present invention.

The linear power amplifier circuit 9 is shown in FIG. 3. It consists of a programmable gain stage 39 and a power amplifier stage 41. The programmable gain stage 39 consists of an analog multiplier U4 and the associated components. The REF OUT signal from Reference Oscillator 5 is connected at REF IN. A resistor R35 and a pair of diodes CR42 and CR43 protect analog multiplier U4 from voltage transients. Analog multiplier U4 provides an output signal voltage that is proportional to the product of its two input signals:

$$V_{out}=(X1-X2)*(Y1-Y2)/10$$

Figure 4:
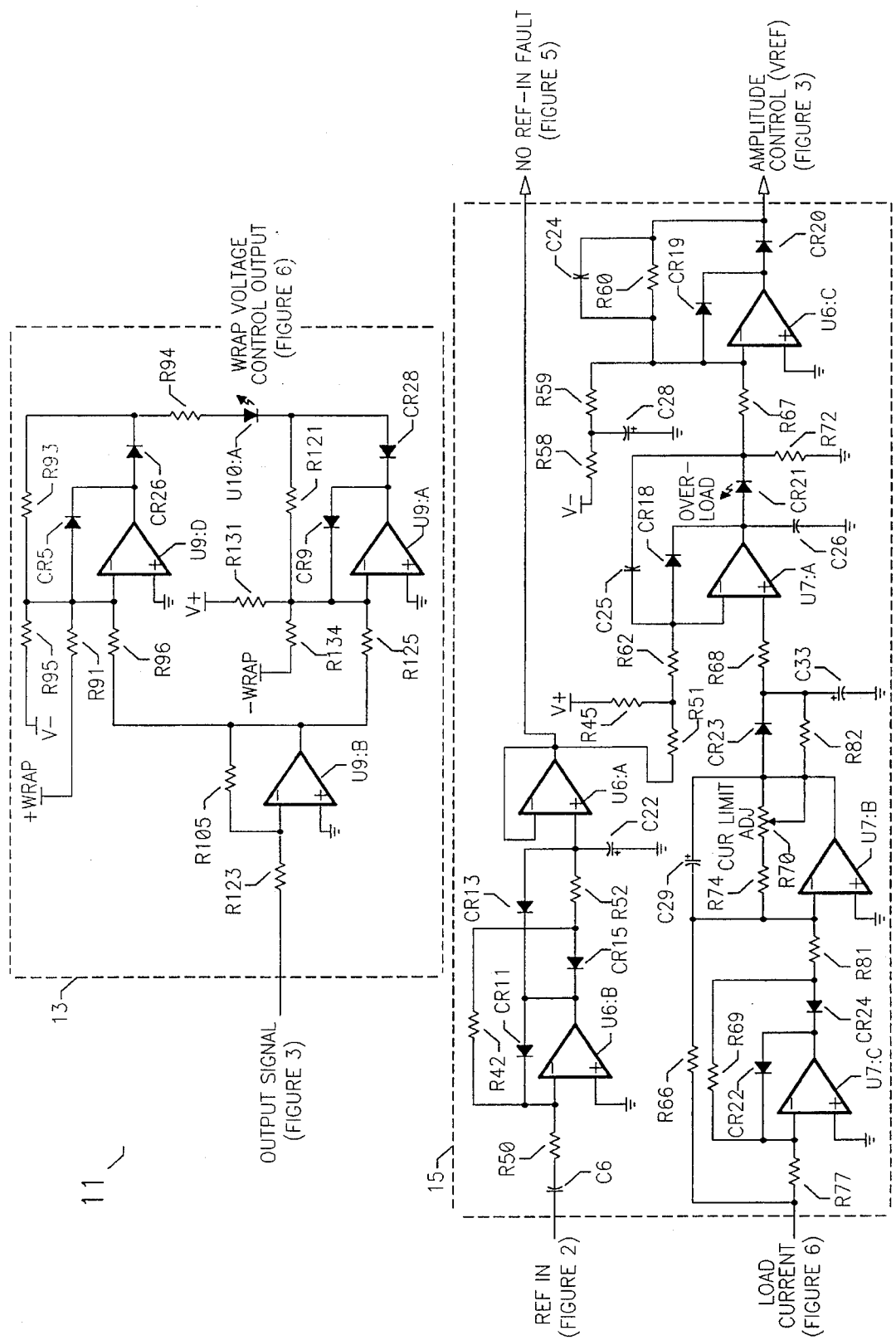
FIGS. 4 is a schematic of the control elements which include the power supply control and automatic amplitude control elements of the present invention.

Input X1 corresponds to the reference oscillator signal as generated by the reference oscillator 5. Input Y1 is an amplitude control voltage generated by an automatic amplitude control circuitry 15 (FIG. 4). Inputs X2 and Y2 are connected to signal common. Thus, the output voltage of U4 is:

$$V_{out}=(X1*Y1)/10$$

The input Y1 of analog multiplier U4 controls the gain of the reference oscillator signal at the input X1. If an overload condition occurs (causing the unit to exceed its output current limit), the amplitude control voltage at input Y1 decreases in value, thereby reducing output voltage $V_{out}$, until the output current of the ringing generator 3 is within the acceptable current limit. A further discussion of the amplitude control voltage is in the Control Circuitry section.

The output signal from analog multiplier U4 is AC coupled by a pair of capacitors C14 and C16, with a resistor R40 providing a resistance path to signal common. A resistor R47 provides isolation between the output of analog multiplier U4 and the + input of operational amplifier U6:D.

The power amplifier 41 consists of an operational amplifier U6:D, a transistor Q6, an optocoupler U5 (U5:A and U5:B), a plurality of power transistors Q1–Q4, and associated discrete components. The amplifier 41 is in fact a power operational amplifier operated as a voltage follower with gain. The inverting input of the power op-amp 41 is at a resistor R38. The non-inverting input is the + input of U6:D. The output is at the anode of a diode CR10. The gain of the voltage follower is:

$$V_{out}/V_i=1(R2+R28)/R49$$

A potentiometer R28 is a factory setting that provides a fine adjustment of the gain. Operational amplifier U6:D provides the first stage of amplification. A resistor R32 and a capacitor C13 provide frequency compensation to stabilize amplifier U6:D. A transistor Q6 converts the output voltage from amplifier U6:D to a current to operate optocoupler U5. The emitter output of optocoupler U5 provides current to the base of power transistor Q3. The emitter of transistor Q3 provides current to the base of transistor Q4. As transistor Q4 begins to conduct, its collector voltage decreases, causing transistor Q4 to sink current from the external load applied to the RING OUT output of the ringing generator 3. When the drive to transistor Q4 is decreased, the collector voltage increases until reaching a positive voltage with respect to signal common. Then a diode CR10 is reverse biased and the collector of transistor Q4 no longer is able to sink current from the output. As the collector of transistor Q4 becomes more positive, a resistor R15 provides current to the base of transistor Q1. The emitter of transistor Q1 then provides current to the base of transistor Q2, causing it to conduct and thereby raising its emitter voltage. Transistor Q2 sources current to the load during positive voltage excursions. A pair of diodes CR2 and CR6 compensate for the base-emitter voltage drop in transistors Q1 and Q2. A pair of capacitors C21 and C7 provide high frequency filtering.

A resistor R55 limits the current to optocoupler U5. A resistor R53 shunts any leakage current from optocoupler U5, allowing transistor Q3 to turn off. A resistor R45 limits the current to the collector of transistor Q3. A resistor R63 shunts any leakage current from transistor Q3, allowing transistor Q4 to turn off. A pair of diodes CR39 and CR40, and a resistor R64 form a current limit circuit for transistor Q4. A pair of series diodes CR39 and CR40 shunt base current away from transistor Q4 when the current through resistor R64 is such that the voltage across resistor R64 is about 0.6 volts. With no further base drive available, transistor Q4 cannot provide additional current through resistor R64, which also limits the current in the collector lead. An identical current limiting circuit consisting of a pair of diodes CR7 and CR8 and a resistor R34 is used to protect transistor Q2. A pair of diodes CR16 and CR17 protect transistor Q4 from voltage transients. A pair of diodes CR1 and CR3 protect transistor Q2 from voltage transients. Power supply NFLOAT+ is a positive voltage typically in the range of 5 to 15 volts DC relative to power supply −WRAP. Power supply PFLOAT+ is a positive voltage typically in the range of 5 to 15 volts DC relative to the output signal at the anode of a diode CR10. Power supplies +WRAP and −WRAP are not DC levels, but follow the output voltage of the ringing generator 3 to reduce power dissipation in the linear power amplifier 9. The WRAP voltages are further described in the Power Supply section.

A resistor R31 provides the series resistance needed to drive a short circuit without damage, and to allow paralleled units to work together.

Overvoltage protection is provided by a tranzorb VR2 which provides a very fast voltage clamp, and also by a triac Q8 and the associated components. If the voltage at a resistor R31 exceeds a safe level, tranzorb VR2 conducts and clamps it to that level. However, the limited power dissipation of tranzorb VR2 would cause it to self-destruct during a relatively long transient. For this reason triac Q8 is used to pull the output voltage down to 0 V. During the presence of a voltage transient, tranzorb VR5 conducts and causes triac Q8 to turn on. This clamps the output to signal common through a resistor R54. When the transient has passed, the gate drive to triac Q8 is removed and triac Q8 turns off allowing normal operation of the ringing generator to resume.

The signal at the cathode of a diode CR2 is brought out through a resistor R4 as a paralleling output signal (PAR 2) from the ringing generator 3. When ringing generators 3 are operated in parallel, the PAR 2 signal on every unit is connected together. This signal insures that no ringing generator 3 attempts to source current while another one is sinking current.

The +WRAP supply is brought out through a resistor R30 as a paralleling output signal (PAR 3). The −WRAP supply is brought out through a resistor R65 as a paralleling output signal (PAR 1). When ringing generators 3 are operated in parallel, the PAR 3 signal on every unit are connected together and the PAR 1 signal on every unit are connected together. This averages out small differences in the WRAP voltages that may be present in the individual ringing generators.

CONTROL CIRCUITRY 11

There are two main functions of the control circuitry 11 as shown in FIG. 4. The portion of the control circuit 11 that guarantees the WRAP voltage is only slightly greater in amplitude than the output voltage at all times, including overload conditions, is the wrap voltage control circuit 13. The portion of the control circuit 11 that automatically limits the output current by reducing the output voltage amplitude is the automatic amplitude control circuit 15.

a) Wrap Voltage Control Circuitry 13

The wrap voltage control circuit 13 comprises a plurality of operational amplifiers U9:A, U9:B, U9:D, and associated discrete components. Amplifier U9:B is an inverting amplifier which monitors the RING OUT voltage (OUTPUT SIGNAL) from the ringing generator 3. The output of amplifier U9:B is of opposite polarity to the RING OUT voltage. Amplifier U9:D compares the voltage from amplifier U9:B with the +WRAP supply voltage, and adds a bias from the V− supply. If the +WRAP voltage is too low, the output voltage at the cathode of a diode CR26 is a positive voltage, causing current to flow through a resistor R94 and an optocoupler U10:A, which causes the switching regulator in the power supply 7 to increase its output, and thus the +WRAP voltage increases. Amplifier U9:A compares the voltage from amplifier U9:B with the −WRAP supply voltage, and adds a bias from the V+ supply. If the −WRAP voltage is too low, the output voltage at the anode of a diode CR28 is a negative voltage, causing current to flow through resistor R94 and optocoupler U10:A, which causes the switching regulator in the power supply 7 to increase its output, and thus the −WRAP voltage increases in magnitude. By using amplifiers U9:D and U9:A in this manner, the +WRAP voltage is fed back to control the switching regulator during the positive portion of the RING OUT signal, and the −WRAP voltage is fed back to control the switching regulator during the negative portion of the RING OUT signal.

The differential voltage between the positive portion of the RING OUT signal and the +WRAP supply is determined by the value of a resistor R95. The differential voltage between the negative portion of the RING OUT signal and the −WRAP supply is determined by the value of a resistor R131. A resistor R93 determines the gain of the +WRAP voltage control loop and a resistor R121 determines the gain of the −WRAP voltage control loop.

b) Automatic Amplitude Control Circuitry 15

The purpose of the automatic amplitude control circuit 15 is to reduce the amplitude of the RING OUT signal when the ringing generator 3 is overloaded. Also, when operating two or more ringing generators 3 in parallel, the automatic amplitude control circuit 15 adjusts the output to match that of the other paralleled units 3.

Figure 6:
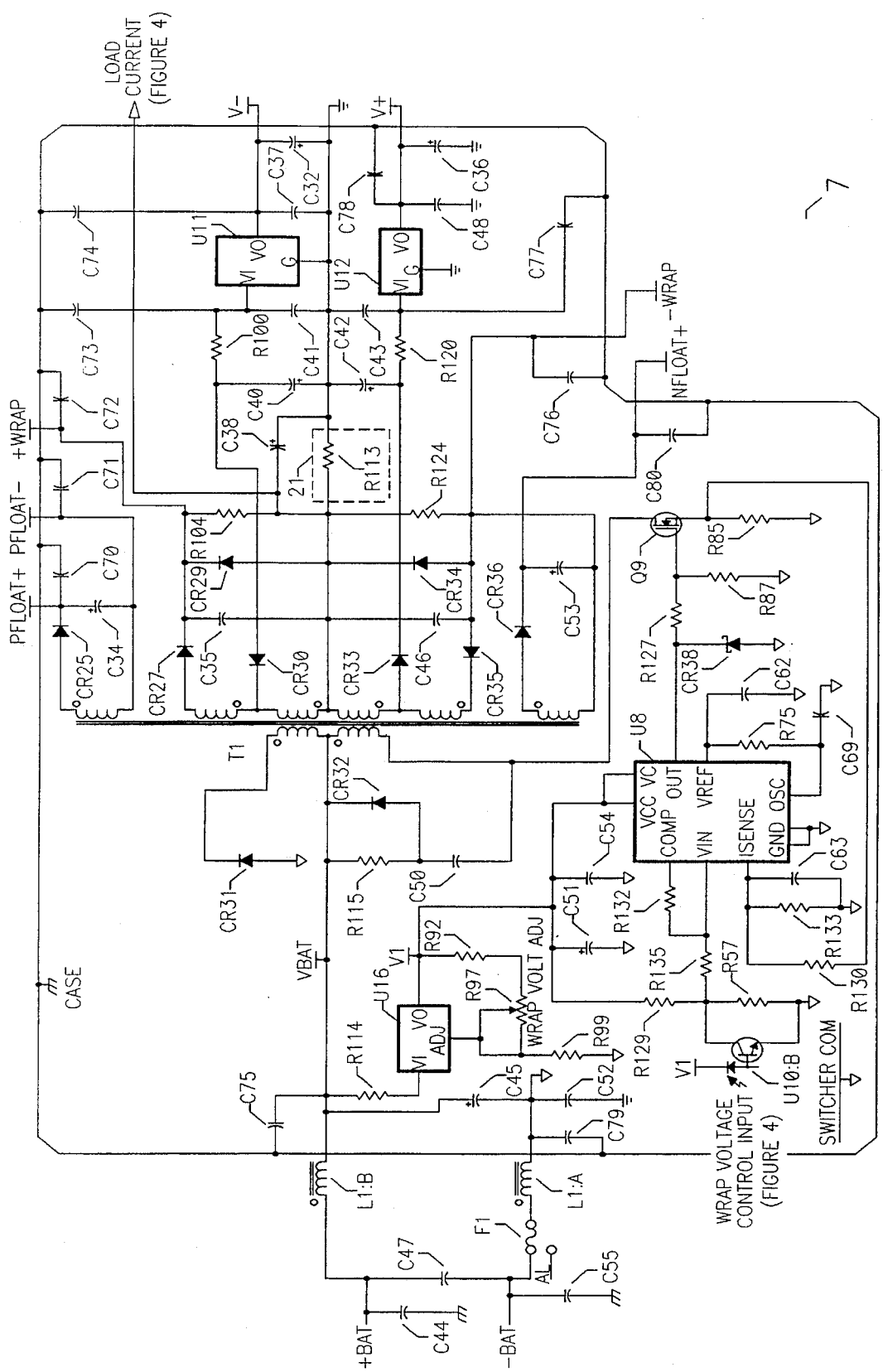
FIG. 6 is a schematic of the power supply elements of the present invention.

Load current supplied by the ringing generator 3 is monitored by a load current sensor 21 in the return leg (COM) or output leg (RING OUT) of the unit 3. In FIG. 6, a resistor R113 acts as a current sensor by monitoring the load current supplied by the ringing generator 3. The voltage across resistor R113 (LOAD CURRENT) is proportional to the output current supplied to the load 23.

A pair of operational amplifiers U7:C and U7:B, and the associated discrete components, form a precision full-wave rectifier and low pass filter. The output from amplifier U7:C, at the anode of a diode CR24, is a precision half-wave rectified signal with negative peaks. Amplifier U7:B is a summing amplifier which sums a current proportional to this half-wave rectified signal and a current proportional to half the voltage across resistor R113. The result of this summation is a full-wave rectified signal, with positive peaks. A capacitor C29 filters this signal providing a DC level at the output of amplifier U7:B. A trimpot R70 adjusts tire gain of tire summing amplifier.

When the output load current increases rapidly, the voltage at the output of amplifier U7:B exceeds the voltage across a capacitor C33. A diode CR23 rapidly charges capacitor C33 keeping it within 1 "diode drop" of the voltage at the output of amplifier U7:B. However, when the output current decreases, the voltage at the output of amplifier U7:B drops below the voltage across capacitor C33 and diode CR23 is reverse biased. A resistor R82 discharges the capacitor C33 at a relatively slow rate. This provides a fast response to a sudden increase of output current, and a slower response to decreasing current requirements.

The DC voltage across capacitor C33 is compared to a DC voltage that is proportional to the desired current limit. In this embodiment, the desired current limit depends on the output voltage setting of the ringing generator. This DC voltage is generated from the REF IN signal by a pair of operational amplifiers U6:B and U6:A, and the associated discrete components.

A capacitor C6 provides AC coupling to the REF IN signal. A resistor R50, amplifier U6:B, a pair of diodes CR11 and CR15, and a resistor R42 form a precision half-wave rectifier with negative peaks. The output (anode of a diode CR15) is filtered by a resistor R52 and a capacitor C22 and buffered by amplifier U6:A. The output of amplifier U6:A is a negative DC voltage proportional to the AC amplitude of the REF IN signal. A pair of resistors R45 and R51 provide a positive bias such that the voltage to resistor R62 decreases with increasing amplitude of the REF IN signal. A diode CR13 provides fast-capture and slow-release function when the output amplitude is being adjusted by a trimpot R6 of the reference oscillator 5.

An operational amplifier U7:A is configured as an inverting integrator. If the signal at the + input of amplifier U7:A is less than the current limit threshold voltage to resistor R62, then the output at the cathode of an LED CR21 is 0 volts. Under this condition, a diode CR18 is forward biased providing the needed feedback from the output of amplifier U7:A to the − input. If the voltage at the + input of amplifier U7:A exceeds the current limit threshold voltage, then a diode CR18 is reverse biased, and negative feedback occurs though a capacitor C25. Current from the output of amplifier U7:A passes though LED CR21 and charges capacitor C25 as required to hold the voltage at the − input of amplifier U7:A equal to the voltage at the + input of amplifier U7:A. The response time is determined by the time constant of resistor R62 and capacitor C25.

The V− supply is used by an operational amplifier U6:C and the associated discrete components to generate a DC reference, the AMPLITUDE CONTROL signal, that is used to control the gain of the linear power amplifier. Current through a resistor R67 is subtracted from the current through the series combination of a pair of resistors R58 and R59. When not in current limit, the signal at the cathode of LED CR21 is at 0 volts and no current is supplied to resistor R67. This causes the maximum output voltage at the cathode of diode CR20. When in current limit, a positive voltage appears at the cathode of LED CR21 causing current to flow in resistor R67. This current is subtracted from the current through the series combination of a pair of resistors R58 and R59, thereby decreasing the AMPLITUDE CONTROL signal. This in turn reduces the amplitude of the ringing generator RING OUT output until the current limit is satisfied. A pair of diodes CR19 and CR20 form a precision half wave rectifier to insure that the AMPLITUDE CONTROL signal cannot be negative.

FAULT MONITOR 19

Figure 5:
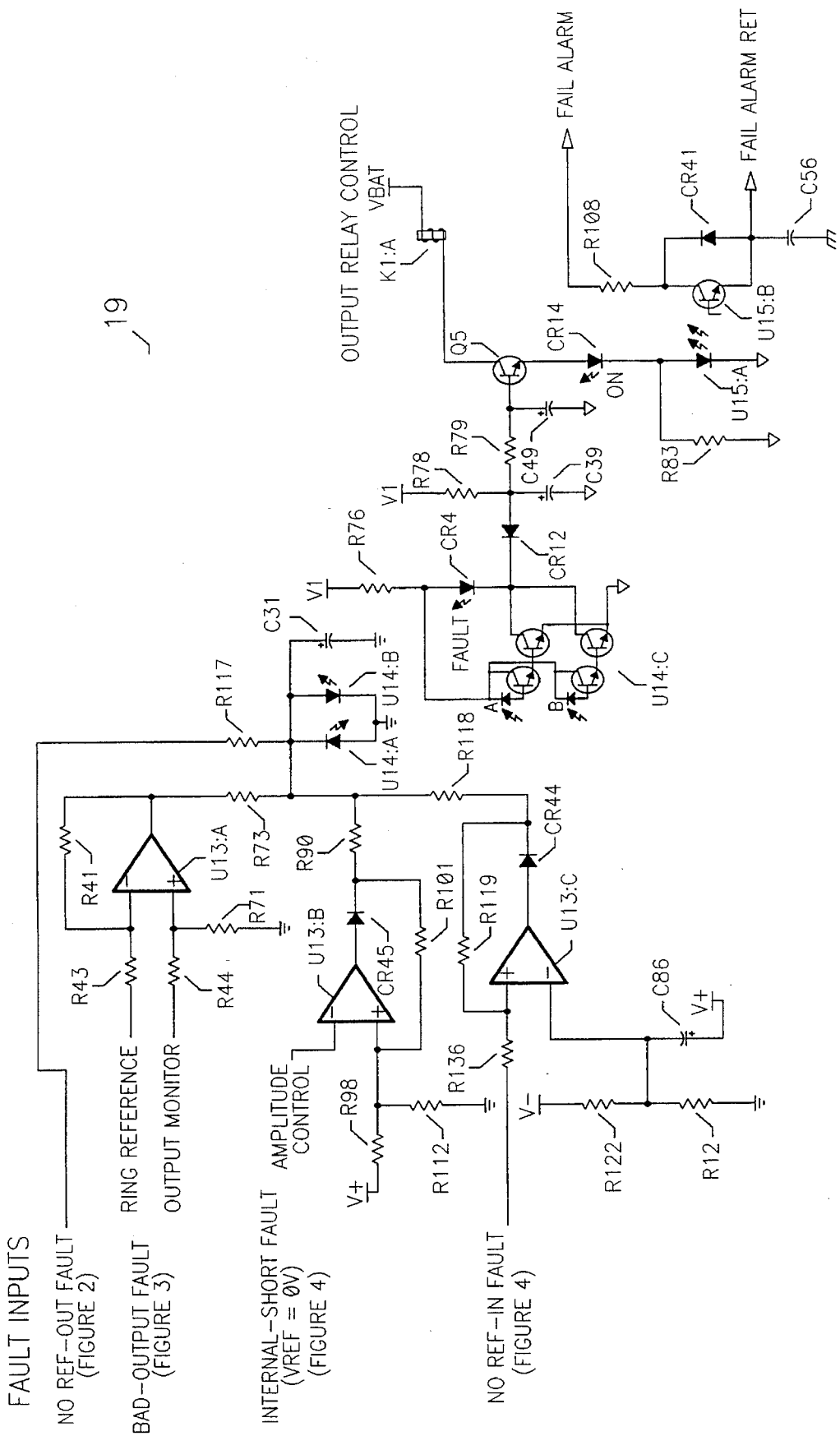
FIG. 5 is a schematic of the fault monitor elements of the present invention.

The fault monitor circuit 19 is shown in FIG. 5. It continuously monitors several key circuits of the ringing generator 3 for proper operation. It monitors the linear power amplifier 9 for a short circuit failure (INTERNAL-SHORT FAULT). It monitors the reference oscillator 5 for a failure in the sine wave oscillator 31 or the summing amplifier 35 (NO REF-OUT FAULT). It monitors the REF IN signal to the linear power amplifier 9 for a failure in the incoming signal (NO REF-IN FAULT). It monitors the linear power amplifier 9 for a distorted RING OUT signal (BAD-OUTPUT FAULT). Should a problem be detected from any of these sources, the fault monitor circuit 19 deactivates a relay K1 (FIG. 4). In the preferred embodiment, the fault monitor 19 also activates a fault indicator on the ringing generator 3, and a fail alarm signal that can be monitored remotely.

a) Internal Short Circuit Fault

An excessive current condition is monitored indirectly using the value of the AMPLITUDE CONTROL signal (FIG. 4). If the current supplied by the ringing generator 3 exceeds the pre-set limit, the automatic amplitude control circuit 15 activates causing the AMPLITUDE CONTROL signal to decrease in amplitude until a safe current is established. In the event of an external short circuit, a resistor R31 in the linear power amplifier 15 provides sufficient series resistance to prevent the AMPLITUDE CONTROL signal from going to 0 volts. However, if the problem is an internal fault in the linear power amplifier 15, the AMPLITUDE CONTROL signal will decrease to 0 volts as the automatic amplitude control 15 attempts to reduce the output current to a safe level. To monitor this internal fault, an operational amplifier U13:B compares the AMPLITUDE CONTROL signal to a DC reference voltage derived from a pair of resistors R98 and R112. A resistor R101 provides hysteresis. Should an internal short circuit occur, the AMPLITUDE CONTROL signal decreases below this DC reference voltage. As a result the output of amplifier U13:B goes positive, causing current to flow through a resistor R90 and into an optocoupler U14. When this occurs an LED CR4 illuminates to annunciate the fault. A capacitor C39 discharges through a diode CR12 and a capacitor C49 discharges through a resistor R79. This causes a transistor Q5 to turn off shortly after the fault occurs which de-energizes a relay K1, extinguishes an LED CR14, and activates the fail alarm. With relay K1 de-energized, the outputs from the linear power amplifier 9 are disconnected from the ringing generator outputs.

b) No REF OUT Fault

Operation of the reference oscillator 5 of FIG. 2 is monitored. The output of an amplifier U7:D is AC coupled by a capacitor C84 and converted to a DC signal proportional to the peak-to- peak AC voltage by a pair of diodes CR48 and CR46, and a capacitor C85. An operational amplifier U13:D compares this voltage to a DC reference voltage obtained from the V+ supply by a pair of resistors R109 and R111. If the voltage across a resistor R110 is greater than this DC reference voltage, then the output of amplifier U13:D is positive. This provides current to the coil of a relay K2 which passes the output of amplifier U7:D to the REF OUT output. If the voltage across resistor R110 is less than the DC reference voltage, then the output of amplifier U13:D is negative which removes the drive to the coil of relay K2. This causes relay K2 to select the BACKUP REF IN signal and apply it to the REF OUT output. The second set of contacts on relay K2 apply V+ to a resistor R117 (FIG. 5), which causes current to flow into an optocoupler U14. When this occurs an LED CR4 illuminates to annunciate the fault. A capacitor C39 discharges through a diode CR12 and a capacitor C49 discharges through a resistor R79. This causes a transistor Q5 to turn off shortly after the fault occurs which de-energizes a relay K1, extinguishes an LED CR14, and activates the fail alarm. With relay K1 de-energized, the outputs from the linear power amplifier 9 are disconnected from the ringing generator 3 outputs. However, the external backup reference oscillator 2 applied to the BACKUP REF IN input is still applied to the REF OUT output. Thus, when operating in a parallel arrangement (FIG. 7B), if the reference oscillator in a MASTER unit M fails, a backup reference oscillator is still provided for a plurality of SLAVE units $S_l$ through $S_n$.

c) No REF IN Fault

The output from an amplifier U6:A (FIG. 4) is a negative DC voltage proportional to the amplitude of the REF IN signal. An amplifier U13:C (FIG. 5) and the associated discrete components form a comparator which compares the output from amplifier U6:A to a DC reference voltage derived from the V− supply by a pair of resistors R122 and R12. A resistor R119 provides hysteresis. If the output from amplifier U6:A is more negative than the DC reference voltage, then the output of an amplifier U13:C is negative and a diode CR49 is reverse biased. If the output from amplifier U6:A is greater than the DC reference voltage, then the output of amplifier U13:C is positive, causing current to flow through a resistor R118 and into optocoupler U14. When this occurs an LED CR4 illuminates to annunciate the fault. A capacitor C39 discharges through a diode CR12 and a capacitor C49 discharges through a resistor R79. This causes a transistor Q5 to turn off shortly after the fault occurs which de-energizes a relay K1, extinguishes an LED CR14, and activates the fail alarm. With relay K1 de-energized, the outputs from the linear power amplifier 9 are disconnected from the ringing generator 3 outputs.

d) Bad Wave Form Fault

The OUTPUT MONITOR, signal is compared to the RING REFERENCE signal to determine if there is a fault in the linear power amplifier 9. This is accomplished with an operational amplifier U13:A and the associated discrete components. Amplifier U13:A is configured as a differential amplifier. The difference between the KING REFERENCE signal (FIG. 3) and the OUTPUT MONITOR, signal (FIG. 3) is amplified and appears as an error signal at the output of an amplifier U13:A (FIG. 5). If an error signal is present, current flows through a resistor R73 and activates a dual optocoupler U14. The two input stages of optocoupler U14 are connected such that either a positive or a negative error voltage will activate the output stage of optocoupler U14. When this occurs an LED CR4 illuminates to annunciate the fault. A capacitor C39 discharges through a diode CR12 and a capacitor C49 discharges through a resistor R79. This causes a transistor Q5 to turn off shortly after the thult occurs which de-energizes a relay K1, extinguishes an LED CR14, and activates the fail alarm. With relay K1 de-energized, the outputs from the linear power amplifier 9 are disconnected from the ringing generator 3 outputs.

e) Fault Recovery

If the fault condition passes, then the error voltage at the corresponding output of amplifier U13 returns to normal, and the output of optocoupler U14 is de-activated. This causes an LED CR4 to extinguish and a capacitor C49 charges through the series combination of resistors R78 and R79. When capacitor C49 achieves a sufficiently high voltage, a transistor Q5 turns on. This energizes a relay K1, illuminates an LED CR14, and deactivates the fail alarm. With relay K1 energized, the outputs from the linear power amplifier 9 are connected to the ringing generator 3 outputs f) Fail Alarm A fail alarm signal is provided by the circuit consisting of an optocoupler U15 and the associated components. The input of the optocoupler U15 is in series with the coil of output relay K1. When relay K1 is activated, optocoupler U15 will also be activated causing its output transistor to turn on. This is the normal condition. If a fault is detected, relay K1 is de-activated which also turns off the transistor switch output of optocoupler U15. This is the fault condition. A resistor R108 provides current limiting to the collector lead of the output transistor and a diode CR41 provides reverse polarity protection.

POWER SUPPLY 7

The power supply circuit 7 is shown in FIG. 6. Power for the ringing generator 3 is normally provided by a 48 volt battery system 1 which has a nominal output of 52.1 volts with an operating battery charger. The preferred embodiment will operate from DC voltages ranging from 40 V to 60 V. With minor component changes, the power supply 7 can operate from other DC voltages. Also with the addition of a full wave rectifier it can operate from an AC source.

a) Switching Regulator

A current mode switching regulator U8 is utilized to obtain the supply voltages needed to operate the ringing generator 3. It is powered from a low voltage DC supply (V1) derived from the battery input 1. The V1 supply voltage is generated by an adjustable linear voltage regulator U16, a plurality of resistors R114, R92, R97 and R99, and a capacitor C51. Voltage (V1) is determined by the value of resistors R92 and R99 and potentiometer R97. A capacitor C51 provides filtering.

The switching regulator U8 provides high efficiency, but also generates high frequency switching transients. A choke L1 and a capacitor C47 form a low pass filter to prevent the switching transients from being transmitted on the battery leads. A pair of capacitors C44 and C55 provide a high frequency by-pass to the case for shielding purposes. All inputs and outputs to the power supply section are by-passed to the case by means of a plurality of capacitors C70–C80.

The WRAP VOLTAGE CONTROL INPUT signal for the switching regulator U8 is derived from the +WRAP and −WRAP voltages. A further description is in the section on Wrap-Voltage Control. The output of optocoupler U10 is the input signal to a resistor R135, and hence to the switching regulator U8. If the voltage to resistor R135 is 0 V, the switching regulator U8 is at maximum drive. If the voltage to resistor R135 is above 5 V, the switching regulator U8 is off (no drive). A pair of resistors R129 and R57 provide a bias voltage at resistor R135 to insure that switching regulator U8 continues to operate at a minimum duty cycle if optocoupler U10 is fully off. The oscillator for switching regulator U8 consists of a capacitor C69 and a resistor R75. The duty cycle of the signal at the OUT pin of switching regulator U8 varies from 0% to 48% in proportion to the drive signal at resistor R135. The OUT pin of switching regulator U8 is capable of driving a power MOSFET transistor. A resistor R127 provides series current limiting and a shottky diode CR38 protects the output of switching regulator U8 from high-speed reverse voltage transients.

A power MOSFET Q9 is the switching element. The current through MOSFET Q9 is measured by the voltage drop across a resistor R85. This voltage is scaled by a pair of resistors R130 and R133 for use by the current sense input of switching regulator U8. Should the current in the MOSFET Q9 build up to an unsafe level, the voltage at the current sense input of switching regulator U8 will cause the switching regulator to turn off for the remainder of the cycle. A capacitor C50, a diode CR32, and a resistor R115 snub voltage transients when MOSFET Q9 turns off.

b) WRAP Voltages

A transformer T1 has several secondary windings to generate the various supply voltages needed by the ringing generator 3. The main supplies are +WRAP and −WRAP. The +WRAP supply is obtained from a rectifier CR27 and a capacitor C35. A resistor R104 is a bleed-off resistor to discharge capacitor C35. A rectifier CR29 protects against reverse voltage transients. The −WRAP supply is obtained from a rectifier CR35 and a capacitor C46. A resistor R124 is a bleed-off resistor to discharge a capacitor C46. A rectifier CR34 protects against reverse voltage transients. These WRAP voltages are controlled such that they follow the RING OUT signal, being slightly greater in amplitude, thus appearing to be wrapped around the RING OUT signal. This reduces power dissipation in the output stage of the power amplifier and improves overall efficiency.

Under no load conditions, resistors R104 and R124 cannot discharge capacitors C35 and C46 fast enough to follow the RING OUT signal as it decreases toward signal common. Therefore, under no load conditions, the WRAP supply appears more like a DC supply with ripple present.

c) Bias Voltages

A positive bias supply is obtained from a winding of transformer T1 by means of a rectifier CR33 and a capacitor C42. The voltage is determined by the peak voltage from the winding of transformer T1 rather than by the duty cycle as is the case with the WRAP voltages. A resistor R120 and a capacitor C43 provide high frequency filtering. A linear regulator U12 provides a fixed DC output voltage. A negative bias supply is obtained from a winding of transformer T1 by means of a rectifier CR30 and a capacitor C40. The voltage is determined by the peak voltage from the winding of transformer T1 rather than by the duty cycle as is the case with the WRAP voltages. A resistor R100 and a capacitor C41 provide high frequency filtering. A linear regulator U11 provides a fixed DC output voltage.

d) FLOAT Voltages

There are two floating supplies, PFLOAT and NFLOAT, that are used in the output stage of the linear power amplifier 9 (FIG. 3). The PFLOAT and NFLOAT voltages are determined by the peak voltage from a winding of transformer T1 rather than by the duty cycle as is the case with the WRAP voltages. The PFLOAT supply is obtained from a winding of transformer T1 by a rectifier CR25 and a capacitor C34. PFLOAT− rides on the RING OUT wave form. PFLOAT+ provides a bias voltage for a transistor Q1 (FIG. 3). The NFLOAT supply is obtained from a winding of transformer T1 by a rectifier CR36 and a capacitor C53. NFLOAT− rides on the −WRAP wave form. NFLOAT+ provides a bias voltage for transistor Q3 (FIG. 3).

INDIVIDUAL AND PARALLEL OPERATION

Figure 7A:
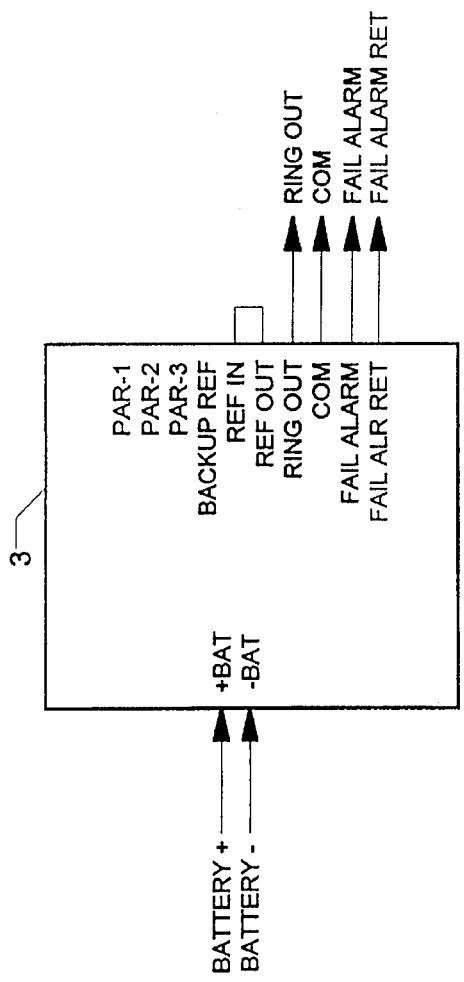
FIGS. 7A and 7B are pin connection charts for ringing generator units.
Figure 7B:
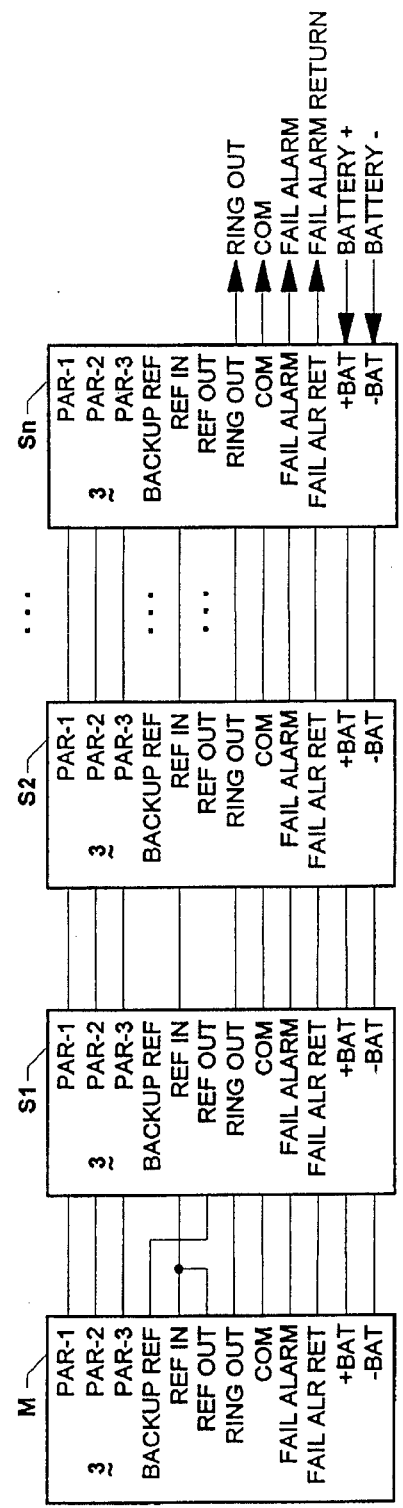

The ringing generator 3 can be operated individually or in a parallel combination with other ringing generators. When ringing generator 3 is operated individually, it is connected as shown in FIG. 7A. A parallel combination of ringing generators can be used to increase output capacity. In parallel operation as shown in FIG. 7B, one ringing generator 3 is designated a MASTER unit M and the others are designated as SLAVES, as shown by labels $S_1, S_2, \ldots S_n$, where n is equal to one less than the total number of ringing generators operated in this parallel combination.

In the parallel combination, the output signal of reference oscillator 5 for the MASTER unit M is used as the reference input for all SLAVE units $S_i$ as well as the MASTER unit M. The reference oscillator 5 in the first SLAVE unit $S_1$ is used as a backup reference oscillator 2 for the MASTER unit M.

The number of ringing generators in this parallel combination is typically chosen such that one ringing generator can fail and the remaining ones can still drive the load. If "N" ringing generators are needed to drive the load, then "N+1" ringing generators are connected in parallel. Because of the fault monitoring 19 in each ringing generator 3, no external monitoring or switch-over means is needed to remove one or more failed units from the parallel combination. Should a unit fail when operating in a parallel combination, its active outputs (RING OUT, PAR-1, PAR-2, AND PAR-3) are automatically disconnected from the other units in the parallel combination. This allows the remaining units to continue normal operation. The failed unit may be removed without shutting down the remaining ringing generators 3. A replacement unit can be installed in the parallel combination while the remaining units are operating. It will power up and operate normally without affecting the operation of the other functional units.

This invention is intended to cover all changes and modifications of the example of the invention herein chosen for purposes of the disclosure which do not constitute departures from the spirit and scope of the invention.

Having thus described the invention, what is claimed and desired to be secured by Letters Patent is:

1. A ringing generator for converting a DC input voltage signal from a DC source having positive and negative output terminals to an AC output voltage at one of output terminals of said ringing generator, said AC output voltage being connected to a variable load and having a continuously adjustable amplitude so as to continuously adapt to the current demanded by said load, said ringing generator including:

a power supply for converting said DC input voltage to variable DC supply voltages, said power supply having positive and negative input terminals connected to said positive and negative output terminals of said DC source respectively and having a plurality of output terminals including positive, negative and common output terminals;

a linear amplifier for converting said variable DC supply voltages to said AC output voltage, said linear amplifier having a plurality of input terminals including positive, negative and common input terminals which are operatively connected to said positive, negative and common output terminals of said power supply, said linear amplifier having a plurality of output terminals including output terminals which are connected to said output terminals of said ringing generator;

control circuitry for automatically and continuously adjusting the amplitude of said variable supply voltages based upon said output voltage being supplied to said load so as to guarantee that at any instant in time said variable supply voltages are slightly greater in magnitude than said output voltage at that instant in time, said control circuitry having a plurality of input terminals including an input terminal connected to one of said output terminals of said linear amplifier, said control circuitry having a plurality of output terminals including positive, negative and common output terminals which are operatively connected to said positive, negative and common input terminals of said linear amplifier respectively, at least one of said plurality of output terminals of said control circuitry also being connected to one of input terminals of said power supply;

a reference oscillator having an output terminal for generating a reference signal at said output terminal, said reference oscillator output terminal being connected to one of input terminals of said linear amplifier; and a load current sensor being connected between said load and one of input terminals of said control circuitry.

2. The ringing generator of claim 1 wherein said linear amplifier includes a plurality of power transistors.

3. The ringing generator of claim 1 including a plurality of said ringing generators combined in parallel to increase the output power being supplied to said load.

4. The ringing generator of claim 1 wherein said reference oscillator includes a sine wave oscillator with either a fixed frequency or a variable frequency.

5. The ringing generator of claim 4 wherein said reference oscillator includes additional oscillators, and a summing amplifier which combines the output signal of said sine wave oscillator with the output signal of said additional oscillators.

6. The ringing generator of claim 4 wherein said reference oscillator further includes a soft start control circuit for holding the output signal of the reference oscillator at approximately zero volts for a short time after powering up the ringing generator and then increasing in amplitude until the output signal of the reference oscillator is at full amplitude.

7. The ringing generator of claim 2 wherein said control circuitry further includes circuitry for automatically protecting said linear amplifier while said ringing generator is experiencing overload conditions by decreasing the amplitude of said supply voltage to a safe level which is only slightly larger in magnitude than said output voltage during such overload conditions.

8. The ringing generator of claim 7 wherein said control circuitry protects said transistors from self-destructive power dissipation due to an excessive voltage drop across said transistors during overload conditions.

9. The ringing generator of claim 8 including a plurality of said ringing generators combined in parallel and said control circuitry regulates and adjusts said output voltage of said parallel combination so that each of said ringing generators provides current to the load.

10. The ringing generator of claim 9, wherein said control circuitry regulates and adjusts said output voltage of said parallel combination so that when one or more ringing generators are in failure, the remaining ones provide current to the load.

11. The ringing generator of claim 9 wherein said control circuitry further includes an output voltage limiting circuit for providing additional protection for said transistors by continuously measuring and monitoring said output voltage to determine if said output voltage exceeds a threshold voltage which reflects the maximum safe operating level for said transistors, said output voltage limiting circuit reducing the amplitude of said supply voltage to said threshold voltage when a voltage exceeding said threshold voltage is detected and until a safe level is achieved.

12. The ringing generator of claim 11 wherein an AC output voltage is generated across said current sensor which is proportional to said AC output current of said ringing generator, said output voltage limiting circuit monitoring said output current of said ringing generator by monitoring said output voltage across said current sensor.

13. The ringing generator of claim 12 wherein said output voltage limiting circuit further includes a full wave rectifier and low pass filter for converting said AC output voltage of said current sensor to a DC voltage which is proportional to said AC output voltage, said proportional DC voltage being compared to a threshold voltage which reflects the maximum safe operating current for said transistors, said proportional DC voltage being reduced to said threshold voltage when said proportional DC voltage exceeds said threshold voltage and until a safe output voltage is achieved, said proportional DC voltage being supplied to said linear amplifier via supply lines.

14. The ringing generator of claim 13 wherein said current sensor is in a return leg of said ringing generator operatively connecting said load to said control circuitry.

15. The ringing generator of claim 14 wherein said control circuitry guarantees that said output voltage remains undistorted at all times.

16. The ringing generator of claim 15 wherein said output voltage limiting circuit increases the output power capability of said parallel combination by ensuring that the total output current supplied to said load is equivalent to the sum of each output current of each ringing generator in said parallel combination.

17. The ringing generator of claim 1 including a fault monitoring circuit for continually monitoring a plurality of critical locations in said ringing generator for any anomaly that would affect said output voltage and thereby degrade the performance of said ringing generator, said fault monitoring circuit automatically removing a failed ringing generator from service by opening the connection between said output terminal of said linear amplifier and said output terminal of said ringing generator so that said ringing generator is removed from operation.

18. The ringing generator of claim 17 wherein said fault monitoring circuit generates an alarm signal and activates a fault indicator if an anomaly is detected.

19. The ringing generator of claim 18 wherein said fault monitoring circuit is automatically reset (restored to normal), when the anomaly clears thereby re-establishing the connection between said output terminals of said linear amplifier and said ringing generator, resetting said alarm fault signal, and extinguishing said fault indicator.

20. The ringing generator of claim 19 including a plurality of said ringing generators combined in a parallel combination and wherein the reference oscillator associated with one ringing generator supplies said reference voltage to all of the linear power amplifier circuits in said parallel combination.

21. The ringing generator of claim 20 wherein said fault monitoring circuit includes a circuit for removing a faulty reference oscillator being used in a parallel combination and replacing said faulty reference oscillator with a reference oscillator associated with a different ringing generator in said parallel combination so that said parallel combination continues to operate normally, said fault monitoring circuit generating said fault alarm when said faulty reference oscillator is detected.

22. The ringing generator of claim 21 wherein said fault monitoring circuit also includes means for increasing the reliability of said ringing generators by connecting an additional ringing generator in said parallel combination beyond those which are needed to supply said load so that if any one ringing generator fails, said fault monitoring circuit disconnects said failed ringing generator from other ringing generators in said parallel combination and generating an alarm signal while the remaining ringing generators continue to supply the necessary total current to said load.

23. The ringing generator of claim 22 wherein said fault monitoring circuit protects said ringing generator such that said output voltage may be indefinitely shorted without damaging said ringing generator.

24. The ringing generator of claim 1 wherein said load current sensor includes a resistor.

25. The ringing generator of claim 1 wherein additional AC signals are selectively superimposed on said AC output voltage.

26. A method for converting a DC input voltage to an AC output voltage having a continuously adjustable amplitude comprising the steps of:

converting said DC input voltage to variable DC supply voltages;

converting said supply voltages to said output voltage by using a linear amplifier including a plurality of power transistors;

supplying said output voltage to a variable load;

adjusting said supply voltages continuously so that at any instant in time said supply voltages are slightly greater in magnitude than said output voltage;

generating a reference voltage which corresponds to the maximum safe operating level for said power transistor;

continuously monitoring said output voltage to determine if said output voltage exceeds said maximum safe operating voltage;

reducing the magnitude of said supply voltages if an excessive output voltage is detected so as to guarantee said output voltage will return to the safe operating level;

continually monitoring said linear amplifier for an overload condition such that if an overload condition is detected, said supply voltages to the linear amplifier are reduced to remain only slightly larger in magnitude than the corresponding reduced AC output voltage of the linear amplifier; and further protecting said power transistors by limiting the current inherent in the design of the linear amplifier so as to further reduce the power dissipation to a safe level for all overload conditions.

27. The method of claim 26 wherein the step of monitoring said output voltage to determine if said output voltage exceeds said maximum safe operating voltage includes the steps of:

monitoring and measuring a voltage from a load current sensor which is proportional to said output current;

generating a DC voltage which is proportional to said AC output voltage by rectifying and filtering said voltage from said load current sensor;

comparing said proportional DC voltage to said reference voltage;

reducing said proportional DC voltage to said reference voltage when said proportional DC voltage exceeds said reference voltage by supplying said DC voltage to said linear amplifier which in turn generates an output voltage within said safe operating range.

28. The method of claim 27 further includes a fault monitoring step including:

continually monitoring said reference voltage, said output voltage and said supply voltage for any anomaly that would affect said output voltage;

generating an alarm signal and activating a fault indicator if an anomaly is detected; and reducing said output voltage to zero if an anomaly is detected and until said anomaly is eliminated.

29. The method of claim 27 wherein said reference voltage, output voltage and supply voltage are monitored at a plurality of locations.

30. The method of claim 27 wherein said load current sensor includes a resistor.

* * * * *